US012541829B2

(12) United States Patent
Hsiao et al.

(10) Patent No.: US 12,541,829 B2
(45) Date of Patent: Feb. 3, 2026

(54) MOTION-BASED PIXEL PROPAGATION FOR VIDEO INPAINTING

(71) Applicant: INNOPEAK TECHNOLOGY, INC., Palo Alto, CA (US)

(72) Inventors: Jenhao Hsiao, Palo Alto, CA (US); Zheng Zhang, Palo Alto, CA (US)

(73) Assignee: INNOPEAK TECHNOLOGY, INC., Palo Alto, CA (US)

( * ) Notice: Subject to any disclaimer, the term of this patent is extended or adjusted under 35 U.S.C. 154(b) by 381 days.

(21) Appl. No.: 18/142,304

(22) Filed: May 2, 2023

(65) Prior Publication Data

US 2023/0274399 A1    Aug. 31, 2023

Related U.S. Application Data

(63) Continuation of application No. PCT/US2020/058552, filed on Nov. 2, 2020.

(51) Int. Cl.
*G06T 5/77*  (2024.01)
*G06T 5/50*  (2006.01)
(Continued)

(52) U.S. Cl.
CPC .................. *G06T 5/77* (2024.01); *G06T 5/50* (2013.01); *G06T 7/246* (2017.01); *G06T 7/33* (2017.01); *G06T 7/73* (2017.01); *G06V 10/776* (2022.01); *G06V 20/46* (2022.01); *G06T 2207/10016* (2013.01)

(58) Field of Classification Search
CPC ............. G06T 5/77; G06T 7/246; G06T 7/33; G06T 5/50; G06T 7/73; G06T 2207/10016; G06T 7/215; G06V 20/46; G06V 10/776
See application file for complete search history.

(56) References Cited

U.S. PATENT DOCUMENTS 8,411,966 B2 *   4/2013   Zhang ....................... G06T 7/73
                                                         382/294
10,645,364 B2 *  5/2020   Kumar ................. H04N 13/246
(Continued)

OTHER PUBLICATIONS

Granados, M. et all., (2012). Background Inpainting for Videos with Dynamic Objects and a Free-Moving Camera. In: Fitzgibbon, A., Lazebnik, S., Perona, P., Sato, Y., Schmid, C. (eds) Computer Vision â ECCV 2012. ECCV 2012. Lecture Notes in Computer Science, vol. 7 (Year: 2012).*

(Continued)

*Primary Examiner* — Chan S Park
*Assistant Examiner* — Chandhana Pedapati
(74) *Attorney, Agent, or Firm* — Sheppard, Mullin, Richter & Hampton LLP

(57) ABSTRACT

Techniques for pixel propagation and video inpainting are described. A video processing application selects, from a sequence of video frames, a reference video frame that includes replacement pixels corresponding to a mask of an undesired object. The video processing application aligns the reference video frame with the target video frame. The video processing application identifies, in the reference video frame, pixels corresponding to the mask. The video processing application uses the pixels from the reference video frame to replace pixels in the target video frame that correspond to the undesired object.

20 Claims, 7 Drawing Sheets

(51) Int. Cl.
    *G06T 7/246*     (2017.01)
    *G06T 7/33*     (2017.01)
    *G06T 7/73*     (2017.01)
    *G06V 10/776*     (2022.01)
    *G06V 20/40*     (2022.01)

(56) References Cited

U.S. PATENT DOCUMENTS

| | | | |
|---|---|---|---|
| 2009/0196475 A1 | 8/2009 | Demirli et al. | |
| 2016/0350936 A1 | 12/2016 | Korchev et al. | |
| 2018/0068451 A1* | 3/2018 | Leung | H04N 23/683 |
| 2020/0118594 A1* | 4/2020 | Oxholm | G06T 7/11 |
| 2020/0175654 A1* | 6/2020 | Tagra | G06T 7/13 |
| 2021/0287007 A1* | 9/2021 | Wang | G06V 20/41 |
| 2021/0342983 A1* | 11/2021 | Lin | G06N 3/088 |
| 2022/0417590 A1* | 12/2022 | Jiao | G06V 20/52 |

OTHER PUBLICATIONS

Woo, S. et al., (2019). Align-and-Attend Network for Globally and Locally Coherent Video Inpainting. ArXiv, abs/1905.13066. (Year: 2019).*

International Search Report and Written Opinion dated Feb. 2, 2021 in International Application No. PCT/US2020/058552.

Ma et al. "Image Matching from Handcrafted to Deep Features: A Survey". international Journal of Computer Vision[online] published Aug. 4, 2020 retrieved Dec. 31, 2020]. Retrieved from the Internet <URL: https://link.springer.com/article/ 10.1007/s11263-020-01359-2>entire document, especially Figs. 2, 8, 9 & p. 15, col. 1, para 2, p. 16, col. 1, para 4, p. 24, col. 1, para 2, p. 29, col. 1, para 2, p. 33, col. 1, para 1,5, p. 36, col. 2, para 2).

Sungho Lee et al. "Copy-and-paste networks for deep video inpainting" In:ICCV. pp. 4413-4421, 2019.

Rui Xu et al."Deep flow-guided video inpainting"In IEEE Conference on Computer Vision and Pattern Recognition, Jun. 2019.

* cited by examiner

MOTION-BASED PIXEL PROPAGATION FOR VIDEO INPAINTING

CROSS-REFERENCE TO RELATED APPLICATION

The present application is a continuation of International Application No. PCT/US2020/058552 filed on Nov. 2, 2020, which is hereby incorporated by reference in its entirety.

BACKGROUND

Digital video can include objects such as people, buildings, roads, etc. In some cases, an object in a video frame is undesired. Techniques exist for removal of objects in images and video frames, but such techniques are deficient. For instance, existing solutions cannot accurately model spatial and temporal changes between video frames.

SUMMARY OF THE INVENTION

The present disclosure relates generally to techniques for object removal in video frames. More particularly, embodiments of the present invention include techniques for removing an undesired object from one or more frames of video using pixel propagation and video inpainting. Embodiments of the present invention are applicable to a variety of applications in video processing systems.

In an embodiment, a method implemented by a computer system receives a sequence of video frames and a set of masks. The sequence of video frames includes an initial video frame including an undesired object and the set of masks includes an initial mask corresponding to the undesired object. The method identifies from the sequence of video frames, a subset of video frames. The method creates, using the set of masks, a combined mask corresponding to the undesired object. The method selects, from the sequence of video frames, a reference video frame that includes replacement pixels corresponding to pixels in a target video frame that are associated with the combined mask. The selecting includes determining that an overlap between the combined mask in the reference video frame and the combined mask in the target video frame is less than a first threshold. The selecting further includes determining that an optical flow metric of the combined mask in the reference video frame compared to the combined mask in the target video frame is less than a second threshold. The method further aligns the reference video frame with the target video frame. The method further replaces, in the target video frame, pixels corresponding to the combined mask with pixels corresponding to the combined mask in the reference video frame.

In an embodiment, receiving the set of masks includes generating the set of masks by identifying, in each video frame of the sequence of video frames, a set of pixels that correlates with a set of pixels of the initial mask.

In an embodiment, creating the combined mask includes determining a subset of the set of masks for which a stability score is greater than a third threshold; and forming, from the subset of the set of masks, the combined mask as a union of pixels corresponding to the undesired object in the subset of the set of masks.

In an embodiment, the determining the overlap includes identifying, in the reference video frame, a first set of pixels that correspond to pixels in the combined mask. The locating includes locating, in the target video frame, a second set of pixels that corresponds to the first set of pixels. The determining includes computing a stability score using the first set of pixels and the second set of pixels.

In an embodiment, the method includes the target video frame to a display device.

In an embodiment, the method includes determining the optical flow metric. Determining the optical flow metric includes determining a difference between pixels that correspond to the combined mask in the reference video frame and pixels that correspond to the combined mask in the target video frame. Determining the optical flow metric further includes computing the optical flow metric based on the difference.

In an embodiment, aligning the reference video frame with the target video frame includes determining feature points in the target video frame and the reference video frame. The aligning further includes sampling a subset of the feature points to provide a validation feature set. The aligning further includes performing feature matching for the validation feature set. The aligning further includes calculating an overall matching score for the validation feature set. The aligning further includes iteratively performing the sampling, the feature matching, and the calculating a predetermined number of times. The method further includes selecting the validation feature set having a highest overall matching score. The method further includes computing a homography for the selected validation feature set.

In an embodiment, sampling the subset of the feature points includes performing a random sampling.

Numerous benefits are achieved by way of the present invention over conventional techniques. For example, embodiments of the present invention provide improved object removal in video frames relative to previous solutions. For instance, by ensuring a stability between a target video frame and a reference video frame and/or by ensuring a minimum optical flow in the reference video frame, disclosed solutions result in a lower error in a resulting reconstructed video frame. Additionally, disclosed solutions can reduce available memory footprint due to avoiding the use of machine learning techniques, which can require large amounts of training data.

The exemplary methods discussed above can be implemented on systems including one or more processors or stored as instructions on a non-transitory computer-readable medium. These and other embodiments of the invention along with many of its advantages and features are described in more detail in conjunction with the text below and attached figures.

DETAILED DESCRIPTION OF SPECIFIC EMBODIMENTS

Embodiments of the present invention relate to removing undesired objects from video frames by replacing pixels corresponding to the undesired object with pixels obtained from a reference video frame. In particular, techniques described herein involve pixel propagation and video inpainting. Pixel propagation refers to identifying pixels from a reference video frame and video inpainting refers to using those pixels to replace pixels representing an undesired object in a target video frame.

As described herein, embodiments of the present invention utilize a motion-detection-based pixel propagation model to perform video inpainting and the methods and systems described herein are useful for removing undesired (e.g., irrelevant) objects, including pedestrians, present in a video. Techniques described herein exploit complementary information between different video frames, which can maximally restore the originality of the inpainted video and enable smoother transitions between inpainted frames, thereby obtaining enhanced temporal consistency. As a result, embodiments of the present invention consistently outperform conventional methods and achieve improved visual perception in comparison with conventional techniques.

As discussed above, video inpainting can be challenging due to a need to model and address both spatial and temporal consistencies between video frames. For instance, an undesired object may be moving within a target video frame. Moreover, an area of a video frame to be used for obtaining replacement pixels for the undesired object may also include moving objects. Existing solutions struggle to obtain an accurate estimate of a pixel-level optical flow (e.g., a measurement of movement within a frame). Further, if a camera that recorded the video frame remains still, a calculated optical flow can sometimes be insufficient for obtaining replacement pixels for the undesired object.

The following non-limiting example is provided for illustrative purposes. A video processing application accesses a sequence of video frames. A user identifies an undesired object to be removed from a target video frame of the sequence of video frames. A video processing application locates the object, if present, in the other video frames. The video processing application identifies, from the sequence of frames, a reference frame to use to obtain missing pixels for the target frame. The video processing application aligns the target frame with the reference video frame and then inpaints, or replaces, missing pixels from the target video frame with replacement pixels from the reference frame, thereby completing the removal of the undesired object.

Figure 1:
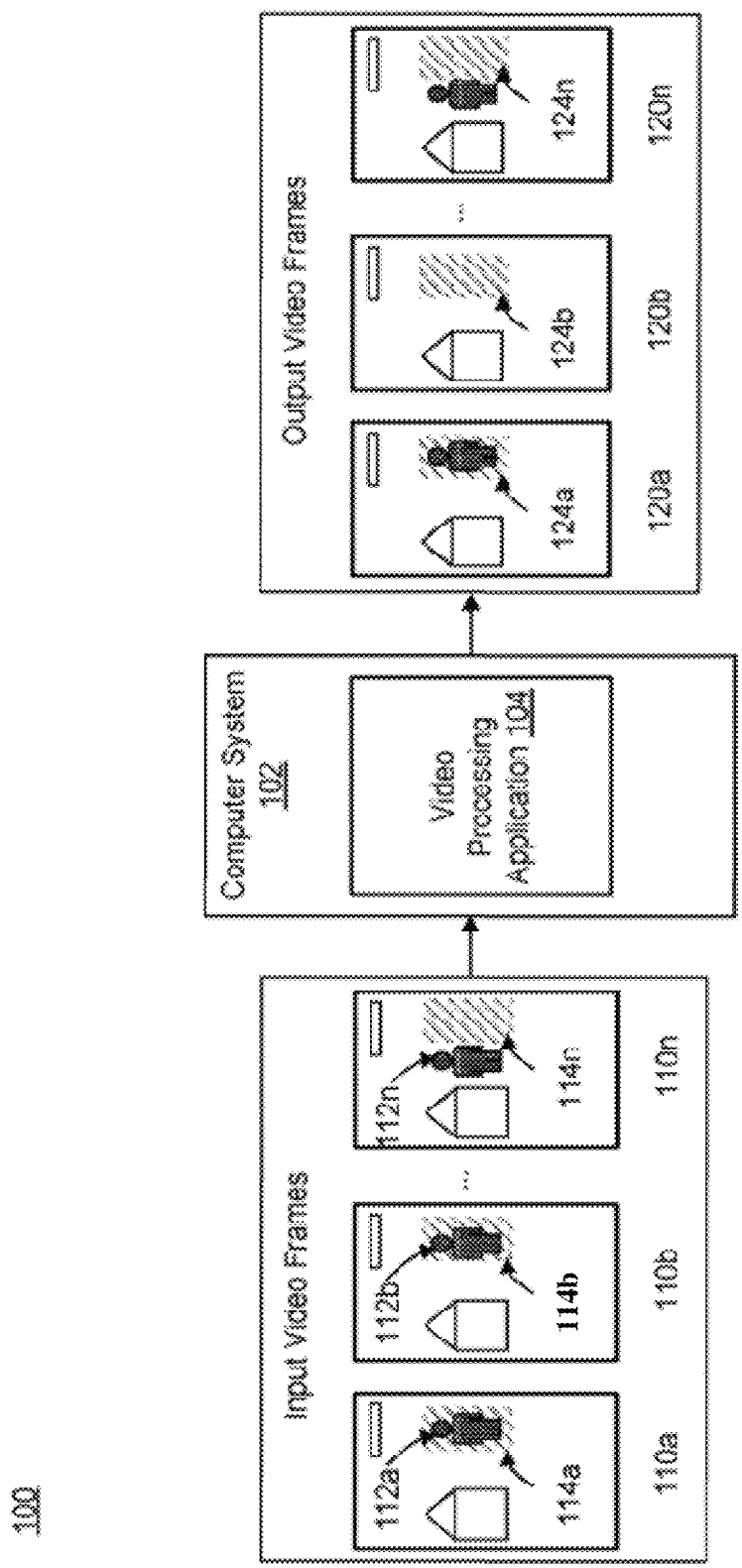
FIG. 1 illustrates an example of a computer system for performing pixel propagation and video inpainting, according to an embodiment of the present invention.

FIG. 1 illustrates an example of a computer system for performing pixel propagation and video inpainting, according to an embodiment of the present invention. FIG. 1 depicts computing environment 100, which includes computer system 102 with video processing application 104, input video frames 110*a*-110*n*, and output video frames 120*a*-*n*. While three input video frames and three output video frames are shown, any length sequence of video frames can be processed.

As depicted in FIG. 1, video processing application 104 accesses input video frames 110*a*-110*n*, each of which can include one or more objects. As depicted, input video frames 110*a*-*n* include objects 112*a*-*n* and background objects 114*a*-*n*. As can be seen, each of objects 112*a*-*n* are in a slightly different position with respect to the position in the other input video frames. Output video frames 120*a*-*n* include background objects 124*a*-*n*, which correspond to background objects 114*a*-*n*.

In the example depicted, object 112*b* in input video frame 110*b* is undesired. Object 112*b* is removed and the corresponding pixels repainted, as shown by the background object 124*b* being inpainted in the location previously occupied by object 112*b*. Replacement pixels for the area previously occupied by object 112*b* are obtained from one or more of the input video frames. An example of computer system 102 is computer system 800 depicted in FIG. 8. An example process that can be utilized in conjunction with computer system 102 including video processing application 104 is described in more detail with respect to FIG. 3.

An indication that object 112*b* is undesired can be identified by input received from a user (e.g., via a user interface) or from a set of received parameters that identify the undesired object (e.g., by location in a frame). Video processing application 104 can remove multiple undesired objects but need only receive an indication from a user of one undesired object.

To remove object 112*b* from the input video frame 110*b*, video processing application 104 uses one or more of the techniques disclosed herein for video inpainting. In an example, if a subset of input video frames 110*a*-*n* is static, e.g., not moving, then video processing application 104 generates a combined mask for the subset, as discussed further with respect to FIG. 4. Video processing application 104 selects, from input video frames 110*a*-*n*, a reference video frame from which to obtain pixels to replace missing data in the target video frame.

Figure 5:
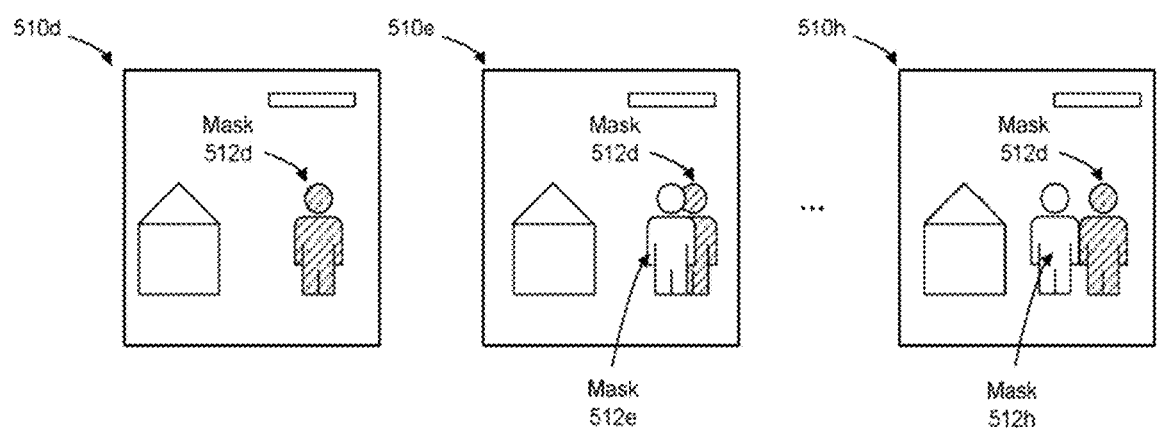
FIG. 5 illustrates an example of determining a reference video frame, according to an embodiment of the present invention.

Selection of a suitable reference video frame is discussed further with respect to FIG. 5. Selecting a reference video frame can include determining a stability score between the target video frame and a reference video frame or determining an optical flow within a reference video frame. Video processing application 104 aligns the target video frame and reference video frame, as discussed with respect to FIGS. 6 and 7. When the inpainting is complete, video processing application 104 generates outputs video frames 120*a*-*n*, which correspond to input video frames 110*a*-*n*. These techniques offer improvements over previous solutions.

Figure 2:
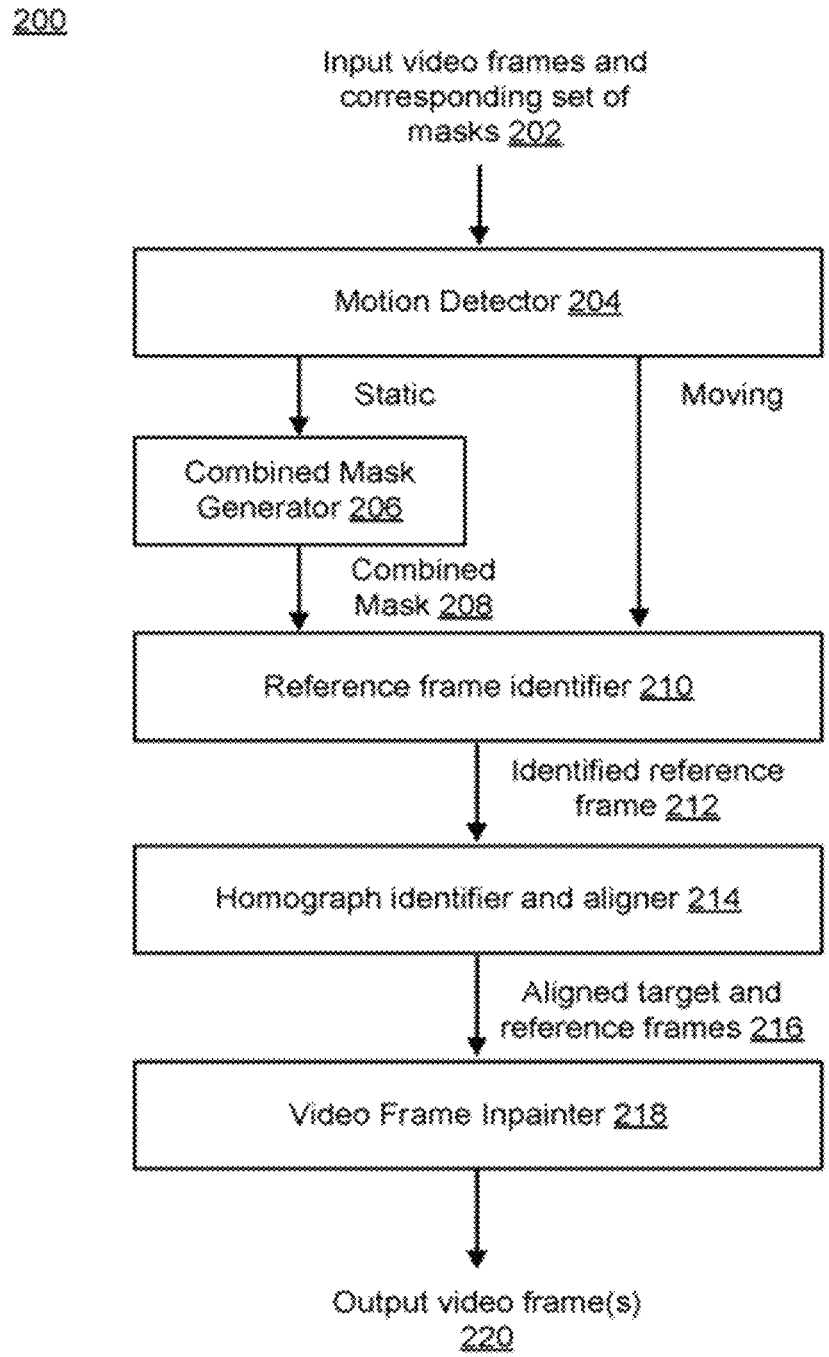
FIG. 2 illustrates an example of a data flow for performing pixel propagation and video inpainting, according to an embodiment of the present invention.

FIG. 2 illustrates an example of a data flow for performing pixel propagation and video inpainting, according to an embodiment of the present invention. FIG. 2 illustrates data flow 200, which depicts an exemplary flow of data between functional blocks of certain embodiments of the present invention. FIG. 2 depicts functional blocks including motion detector 204, combined mask generator 206, reference frame identifier 210, homograph identifier and aligner 214, and video frame inpainter 218. These functional blocks can be implemented by video processing application 104 of computing system 102.

In the example depicted by FIG. 2, input video frames and a corresponding set of masks 202 are provided to video processing application 104, which implements motion detector 204. For example, the set of masks, which can be provided by a computer or a user, corresponds to the input video frames. Each mask is associated with a video frame and defines the position of an undesired object to be removed. One of ordinary skill in the art would recognize many variations, modifications, and alternatives.

Figure 3:
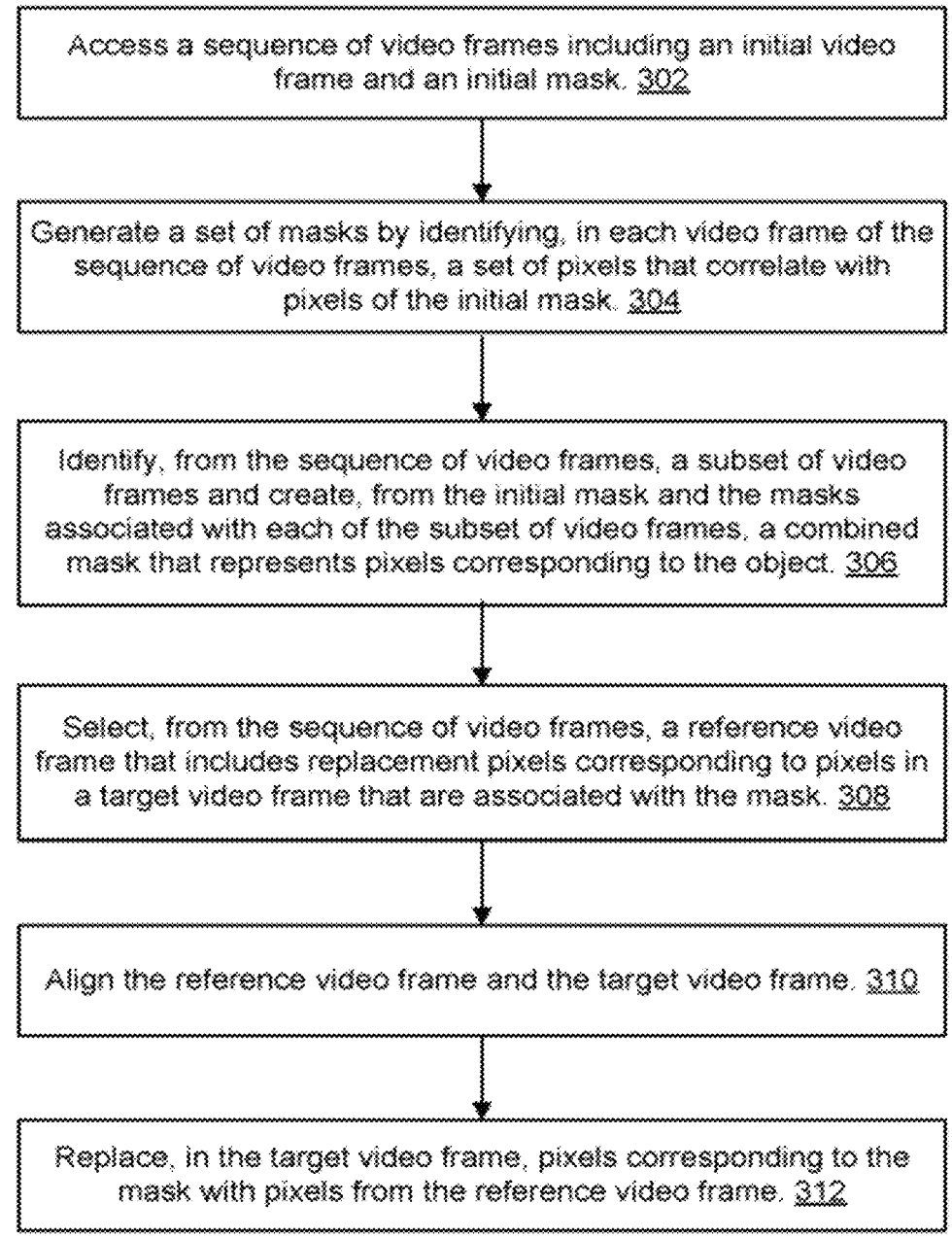
FIG. 3 is a flowchart illustrating a method of performing pixel propagation and video inpainting, according to an embodiment of the present invention.
Figure 4:
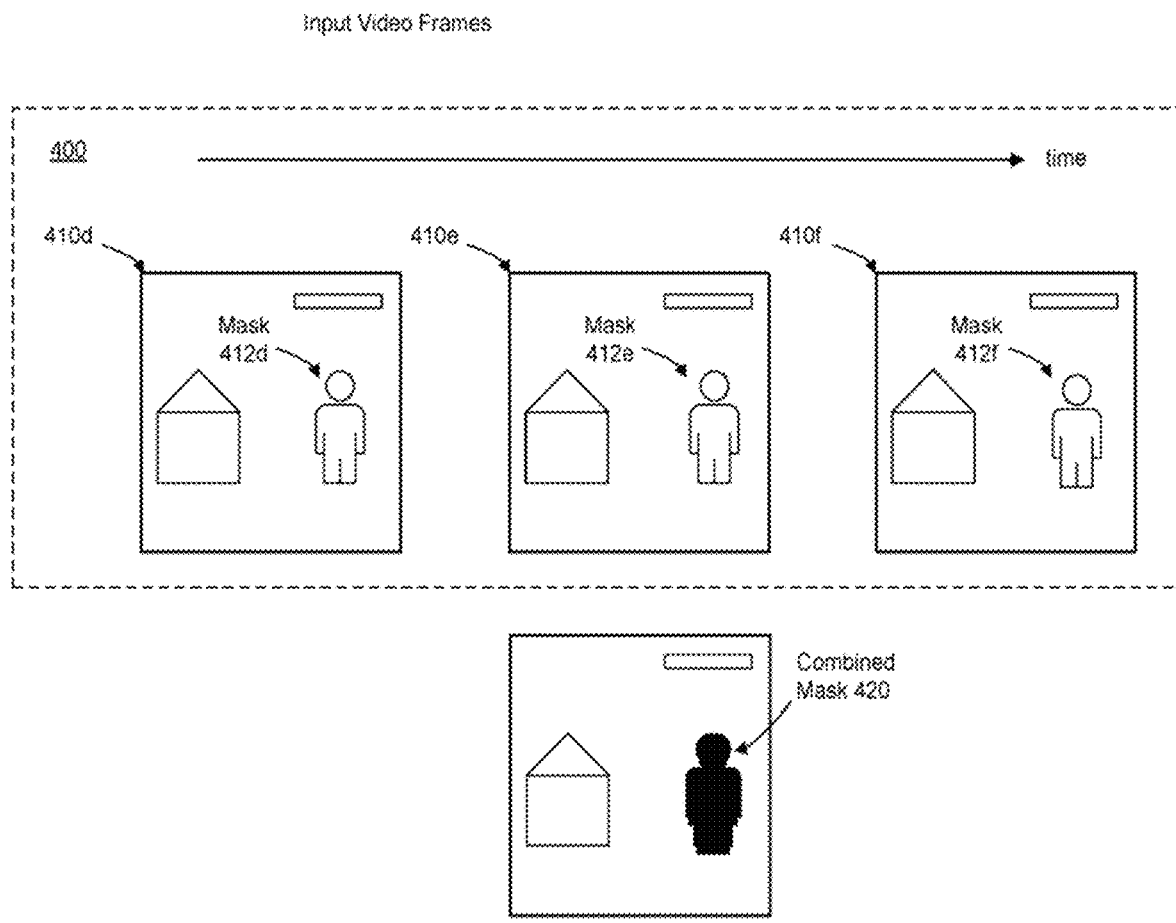
FIG. 4 illustrates an example of generating a subset of video frames and an associated combined mask, according to an embodiment of the present invention.

As explained further with respect to FIGS. 3 and 4, if the mask in a subset of input video frames is static, then the video processing application 104, implementing the combined mask generator 206, generates a combined mask associated with the subset of input video frames. Thus, embodiments of the present invention utilize a mask stabilization process for static masks. Combined mask 208 is output from combined mask generator 206 based on data from the input video frames 110a-n and is provided to the video processing application 104, which implements the reference frame identifier 210. By contrast, if the mask is moving, then a combined mask is not generated in the embodiment illustrated in FIG. 2.

Identifying a reference frame, as discussed further with respect to FIGS. 3 and 5, involves identifying, from the input video frames, a video frame that has a mask with a minimum overlap with respect to the mask in the target video frame (e.g., the video frame with data to be replaced). Therefore, a suitable reference frame has a maximum amount of pixel data to use for replacement of the mask area in the target video frame. Examples of operations performed to identify a reference frame include overlap detection and optical flow detection. Either overlap detection, optical flow detection, or both can be used.

Continuing the example, the identified reference frame 212 is passed to video processing application 104, which implements the homograph identifier and aligner 214. As discussed with respect to FIGS. 3 and 6, homographs can be identified and used for aligning the target video frame and the reference video frame. In an example, alignment is useful if a scene depicted in the target video frame differs slightly from a scene depicted in the reference video frame, for example, due to camera panning. A homograph refers to a representation, e.g., a matrix, between a first set of pixels in the target video frame and a corresponding second set of pixels in the reference video frame. The aligned target and reference video frames 216 are passed to video processing application 104, which implements the video frame inpainter 218. Video processing application 104 uses the homograph to generate an output video frame 220 by replacing pixels in the target video frame that represent the object to be removed with corresponding pixels in the reference video frame.

FIG. 3 is a flowchart illustrating a method of performing pixel propagation and video inpainting according to an embodiment of the present invention. For instance, flow 300 can be used to identify a reference video frame that includes pixels used to replace pixels in a target video frame that correspond to an undesired object. Flow 300 represents an example of removing one undesired object from one target video frame. Accordingly, flow 300 may be repeated in part or in whole to remove the undesired object from additional video frames. Additionally, flow 300 may be repeated in part or in whole to remove additional undesired objects from the one target video frame and/or additional video frames. Video processing application 104, executing on computing system 102, can implement flow 300.

In an example, the flow 300 includes operation 302, in which the computer system (e.g., computer system 102) accesses a sequence of video frames including an initial video frame and an initial mask. As discussed above, the initial mask may be one of a set of masks. For instance, video processing application 104 accesses input video frames 110a-n and an initial mask that represents pixels corresponding to the undesired object. The mask can represent all of the pixels that correspond to the undesired object. While flow 300 discusses removing a single undesired object from a video frame, it can be appreciated that flow 300 can be performed multiple times, for example, to remove multiple undesired objects from one or more video frames. In that case, each video frame can have multiple masks and the video will have a number of masks equal to the number of multiple masks times the number of frames. In another example, flow 300 can be performed such that multiple undesired objects are removed in parallel.

In an example, the flow 300 includes operation 304, in which the computer system (e.g., computer system 102) generates a set of masks by identifying, in each video frame of the sequence of video frames, a set of pixels that correlate with pixels of the initial mask. Continuing the example, assuming that the initial mask represents input video frame 110a, then video processing application 104 creates a mask for each of input video frames 110b-n by identifying the undesired object in the input video frames 110b-n. In other embodiments, the set of masks associated with the input video frames can be received from a separate system and not generated as a component of flow 300, rendering operation 304 optional. One of ordinary skill in the art would recognize many variations, modifications, and alternatives.

Object detection can involve different techniques such as correlation. For instance, for each pixel in the initial mask, video processing application 104 identifies a corresponding pixel in input video frame 110b by selecting a pixel from input video frame 110b that has a correlation above a threshold. This process can continue for all of the pixels in the initial mask, for each input video frame 110b-n. In other embodiments, other methods for performing object detection can be utilized in additional to correlation-based methods. One of ordinary skill in the art would recognize many variations, modifications, and alternatives. The masks generated at operation 302 can be referred to as unstabilized masks.

In an example, the flow 300 includes operation 306, in which the computer system (e.g., computer system 102) identifies, from the sequence of video frames, a subset of video frames and creates, from the initial mask and the masks associated with each of the subset of video frames, a combined mask that represents pixels corresponding to the object. Subsets of the sequence of video frames may have enough temporal consistency to have a combined mask, e.g., mask that is in common between frames in the subset. Having a combined mask can simplify other processes. If there are no subsets of input video frames that are static, then operation 306 is not performed.

Various techniques can be used to create a combined mask from the initial mask and the masks associated with the other video frames. For example, given an initial mask associated with an initial video frame, a tracking algorithm or machine learning model could be used to generate the masks, which can be referred to as object masks, for the other video frames. As an example, a Siamese network model can be used to generate the masks for the other video frames. But because masks generated by tracking can be temporally inconsistent in terms of mask shape, in some cases, a tracking algorithm alone might not produce a single mask that is stable across multiple frames. Thus, embodiments of the present invention utilized techniques to generate a combined mask that is then used in video inpainting.

FIG. 4 illustrates an example of generating a subset of video frames and an associated combined mask, according to an embodiment of the present invention. FIG. 4 depicts a subset of video frames 400 and an associated combined mask 420 identified by video processing application 104. Subset of video frames 400 includes video frames 410d-f and is a subset of the input video frames 110a-n. In this example, one of video frames 410d-f is the target video frame, e.g., the video frame including pixels to be replaced, but this need not be the case.

As depicted, each of video frames 410d-f includes a respective mask, e.g., video frame 410d includes mask 412d, input video frame 410e includes mask 412e, and video frame 41 Of includes mask 412f. Masks 412d-f can be generated at operation 304 or received from a separate system. Each of masks 412d-f corresponds to the same undesired object. But as discussed, the undesired object may have changed shape slightly or moved slightly between frames.

Video processing application 104 identifies a subset of video frames 400 from input video frames 110a-n by determining a stability score for the frames and verifying that the stability score is within a tolerance or greater than a threshold. In an example, a motionbased stabilization approach can be used to stabilize masks 412d-f. In this approach, video processing application 104 generates a stability score to estimate a stability of a mask over time (i.e., between frames). In particular, given masks $M_t$ (the mask in the target frame, e.g., video frame 41 Od) and $M_{t+d}$ (the mask in a frame that is d frames ahead of the target frame, e.g., video frame 41 Of), the amount of overlap between mask $M_t$ associated with the frame at time t and mask $M_{t+d}$ associated with the frame at time t+d is used to estimate the stability of the masks associated with the frames corresponding to times t to t+d.

The stability score for masks $M_t$ and $M_{t+d}$ can be defined as:

$$I(M_t, M_{t+d}) = \frac{\sum(M_t \odot M_{t+d})}{\text{Max}(\sum(M_t, M_{t+d}))}.$$

The stability score I can be used to determine whether the motion of the undesired object during a specific time segment is greater than a predefined threshold. In an example, if a stability threshold is 0.7, then, in this case, I>0.7 would indicate that an object is not moving. This is referenced as the Static path in FIG. 2. In some embodiments, video processing application 104 checks the stability score for subsets of frames having different durations and determines the subset of frames having the longest duration for which the mask stability score is greater than the threshold.

Continuing the example, video processing application 104 determines the stability score I for video frames 410d-f. If $[D_s, D_e]$ defines a time segment (e.g., as depicted, the period from video frame 410d through video frame 410f), during which that the undesired object remains still, i.e., I is greater than a threshold, then the masks associated with these frames are combined into a combined mask $M_u$. Then, the combined mask, which is a stabilized mask, is computed by forming the union of all the masks during this period:

$$M_u = \cup_{i \in [D_s, D_e]} M_i$$

Thus, video processing application 104 generates combined mask 420 that represents a union of the masks 412d-f. The inventors have determined that the generation of combined mask 420 enables a reduction in flicker in comparison with conventional techniques.

Returning to FIG. 3, in an example, the flow 300 includes operation 308, in which the computer system (e.g., computer system 102) selects, from the sequence of video frames, a reference video frame that includes replacement pixels corresponding to pixels in a target video frame that are associated with the mask. The subset of video frames can include the target video frame.

The information in the reference frame is used to recover the region in the target frame that was covered by the mask and removed. This region can also be referred to as the missing region in the target frame. The reference frame is the frame with the most complementary information relative to the target frame, for example, the most information to complete the area of the target frame that represents the undesired object. A high amount of complementary information corresponds with the reference frame having an overlap between the mask in the reference frame and the mask in the target frame less than an threshold. In some cases, the overlap is zero, i.e., a minimum overlap, whereas in other embodiments, the overlap can characterized by a value less than a threshold, for example, a stability score less than 0.0005. FIG. 5 illustrates an example approach for determining a reference frame from a subset of video frames.

Identifying a video frame to designate as the reference video frame can include measurements of overlap between the mask in the target frame relative to the mask in the reference frame and/or measurements of the optical flow of the mask between the target frame and the reference frame. The overlap measurement and optical flow measurements can each have a separate threshold that is met before a given candidate reference frame is chosen as the reference frame. Optical flow refers to a measurement of movement of a region in the reference video frame that corresponds to the mask of the target video frame. For instance, video processing application 104 can determine for each pixel in the reference video frame that corresponds to the mask in the target video frame, a difference between the pixel and a corresponding pixel in the target video frame.

FIG. 5 illustrates an example of determining a reference video frame, according to an embodiment of the present invention. FIG. 5 depicts video frames 510d-h. As can be seen, each video frame 510d-h includes a mask (512d-h respectively). If the region of video frames 510d-h is static, then masks 512d-h can be the combined mask. For illustrative purposes, video frames 510d-e are from the subset of video frames identified in operation 306, whereas video frame 510h is not from the subset of video frames identified in operation 306. Video frame 510d is the target video frame, therefore mask 512d represents the area to be replaced with pixels from the to-be identified reference video frame.

A stability score of masks corresponding to different frames can be calculated using a similar approach as that used to compute the stability score used to determine the combined mask (e.g., as discussed in operation 306). For example, a stability score for mask $M_t$, which is the mask of the target frame, and mask $M_c$, which is a mask of a candidate reference frame, is $I(M_t, M_c)$. This stability score is used in the embodiment illustrated in FIG. 5 to determine whether the candidate reference frame can be designated as the reference frame Fr, i.e., when the overlap between the masks decreases below a threshold. $I(M_t, M_c)$ is given by:

$$I(M_t, M_c) = \frac{\sum(M_t \odot M_c)}{\text{Max}(\sum(M_t, M_c))}$$

Continuing the example, assuming that video frame 510d is the target video frame, then video processing application 104 computes the stability score for mask 512e in video frame 510e and mask 512h in video frame 510h in relation to mask 512d to determine if either of these video frames are a suitable reference video frame. In particular, video processing application 104 identifies, in the candidate reference video frame, a first set of pixels that correspond to pixels in the mask. A set of pixels can include one or more pixels. The video processing application 104 locates a second set of pixels in the target video frame that correspond to the first set of pixels. The video processing application 104 further computes the stability score based on a difference between the first set of pixels and the second set of pixels. Depending on the application, a suitable stability score might be I<0.005 or zero (indicating a minimum overlapped mask).

Referring to FIG. 5, video frame 510e includes mask 512e that partially overlaps with mask 512d. For this video frame, the object associated with mask 512d in video frame 510d and with mask 512e in video frame 510e has moved to the left, but still overlaps with the position the object was positioned at in video frame 510d. Thus, mask 512e and mask 512d will be characterized by a stability score greater than the predefined stability score, indicating that video frame 510e is not a suitable reference frame.

In contrast, in video frame 510h, mask 512h has moved farther to the left, correlating to the object associated with the mask moving farther to the left, reaching a position that shares little to no overlap with mask 512d. As a result, the stability score for these masks will be below the predefined threshold and video frame 510h will be selected as the reference video frame.

In addition to overlap, embodiments of the present invention can utilize optical flow techniques in selecting the reference video frame. Optical flow is related to the motion of objects between consecutive frames in a sequence of video frames and can be caused by the relative movement between the object and camera. Optical flow can be computed by measuring a displacement of a given pixel in a second frame relative to a first frame and then measuring a rate of change of the displacement. An optical flow map is defined as a map of movement within a region and can be determined by analyzing distances between the locations of pixels in the mask of the target video frame and corresponding pixels in the mask of the candidate reference video frame.

The use of an optical flow map helps to prevent a non-stable region in a reference frame from being used in the inpainting process. If the region in a frame that corresponds to the mask has high motion with respect to the mask in the target frame Ft, this frame, although it could be utilized as the reference video frame, can be ignored and video processing application 104 can search for another candidate reference frame to select as the reference video frame. As an example, video processing application 104 can consider the next video frame in the sequence as the candidate reference video frame. Using this optical flow technique, embodiments of the present invention provide reference video frames for which the mask of the reference frame mainly contains background objects and not moving foreground objects.

Thus, embodiments of the present invention can compute an optical flow map to identify a reference video frame for which the mask has an optical flow less than a particular threshold. As an example, if the mask has high optical flow (i.e., the sum of optical flow in the mask is greater than a threshold), it can be determined that the mask includes pixels categorized as a foreground region and, although the overlap metric was satisfied, this candidate reference frame will not be selected as the reference video frame. In another case, the mask can be characterized by a low optical flow. For this candidate reference frame, the mask can be categorized as a background region and the candidate reference frame for which the overlap metric was satisfied can be selected as the reference video frame.

In an example, video processing application 104 determines, for each pixel corresponding to the mask in the reference frame, a distance between a first location of the pixel and a corresponding second pixel corresponding to the mask in the target video frame. Video processing application 104 then computes the optical flow map based on the distance. In another example, an optical flow is calculated as an average of all the pixel distances and can be used in lieu of an optical flow map. An example of a suitable optical flow threshold is 0.5 (50%).

In some cases, multiple candidate reference frames that each have suitable overlap and/or optical flow may be identified. In an embodiment, video processing application 104 selects the reference frame as the reference frame meeting the criteria that is closest in time to the target reference frame.

Returning to FIG. 3, in an example, the flow 300 includes operation 310, in which the computer system (e.g., computer system 102) aligns the target video frame and the reference video frame. Alignment is helpful when a camera has panned between the target video frame and the reference video frame.

Given the reference video frame and the target video frame, an alignment process is utilized in which feature point detection is performed. Potential feature correspondences between the target video frame and the reference video frame are identified using an appropriate method, for example, based on Oriented FAST and rotated BRIEF (ORB) feature points, and outliers are discarded by estimating fundamental matrices using RANdom SAample Consensus (RANSAC).

In order to generate a number of validation feature sets, an ensemble strategy is utilized in which a random sampling of a subset of the feature points in the target frame and the reference frame is conducted. As an example, 30% of the matching pairs of feature points can be randomly selected to build one of K validation feature sets. Using this validation feature set that includes the randomly selected 30% of the matching pairs, feature matching is performed and an overall matching score can be computed for the validation feature set.

The processes of selecting a random sample of a subset of the feature points to form a validation feature set and computing an overall matching score is then repeated K times. This provides K validation feature sets and K overall matching scores. The validation set with the highest overall matching score is then selected for use in computing a homography based on the validation set with the highest overall matching score. In computing this homography, outliers, for example, identified with RANSAC, can be discarded. As an example, the overall matching score can be determined as the minimum matching distance between matching pairs. This can also be the alignment with the minimum total LI loss between matching pairs).

Using the homography based on the validation set with the highest overall matching score, the reference video frame can be projected to the target video frame and the pixels associated with the mask in the reference video frame can be utilized to replace the pixels associated with the mask in the target reference video frame, i.e., perform video inpainting. As will be evident to one of skill in the art, embodiments of the present invention are not limited to the selection of random sets of 30% of the matching pairs and other subset percentages can be utilized. One of ordinary skill in the art would recognize many variations, modifications, and alternatives.

Thus, to improve the alignment accuracy, embodiments of the present invention use an ensemble strategy that selects from among multiple alignment results to deliver a more accurate final result. In alternative embodiments, a set of candidate homographies can be computed between the target video frame and the reference video frame, and then for each pixel, the single homography that minimizes or reduces the resulting alignment error can be utilized.

Figure 6:
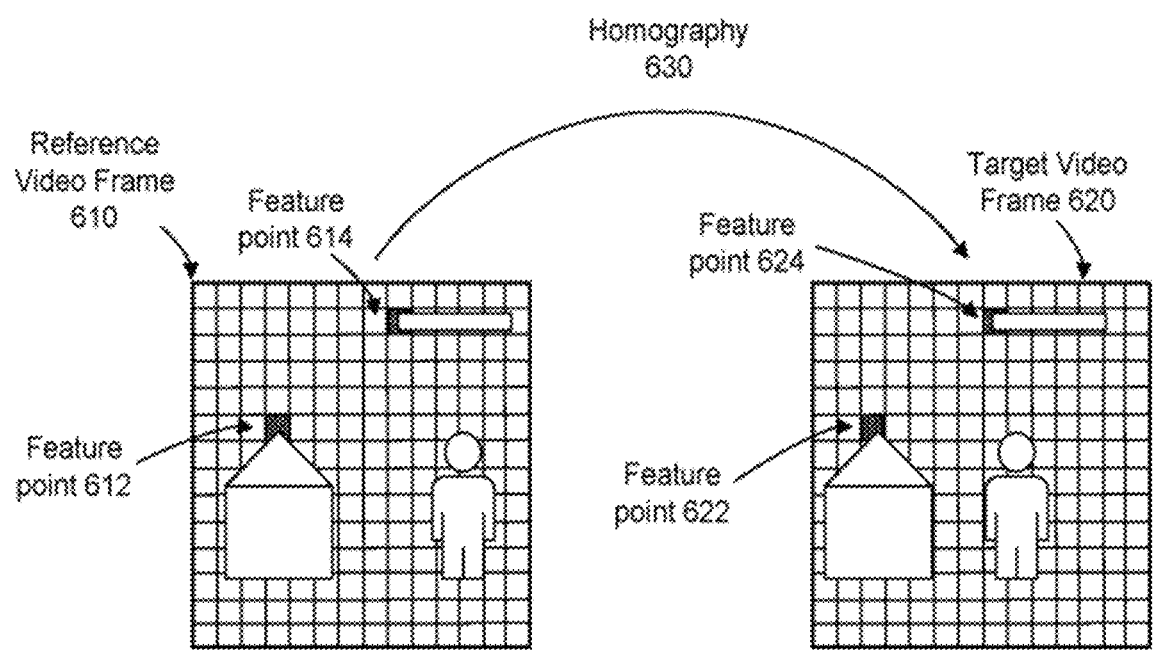
FIG. 6 illustrates an example of aligning a target video frame and a reference video frame, according to an embodiment of the present invention.

FIG. 6 illustrates an example of aligning a target video frame and a reference video frame, according to an embodiment of the present invention. FIG. 6 depicts reference video frame 610, target video frame 620, and homography 630. Reference video frame 610 includes feature point 612 and feature point 614. In this example, feature point 612 is associated with the top of the house shaped object and feature point 614 is associated with an edge of the awning shaped object. Target video frame 620 includes feature point 622 and feature point 624. Gridlines are shown for illustration purposes only.

As described above, a subset of the feature points are selected, for example, randomly, in an iterative manner to form the K validation feature sets. Although FIG. 6 only illustrates two matching pairs: feature points 612 and 622 and feature points 614 and 624, it will be appreciated that other number of matching pairs can be utilized. In this example, the validation set associated with the illustrated feature points yields the highest overall matching score and this validation set is used in computing homography 630. As described above, in other embodiments, a set of K candidate homographies can be generated based on the K validation sets. Homography 630 would be one of this set of K candidate homographies. Each of the homographies in this set of K candidate homographies can then be analyzed and the homography that minimizes or reduces the resulting alignment error between the matching pairs of feature points can be utilized as the homography for video inpainting.

Figure 7:
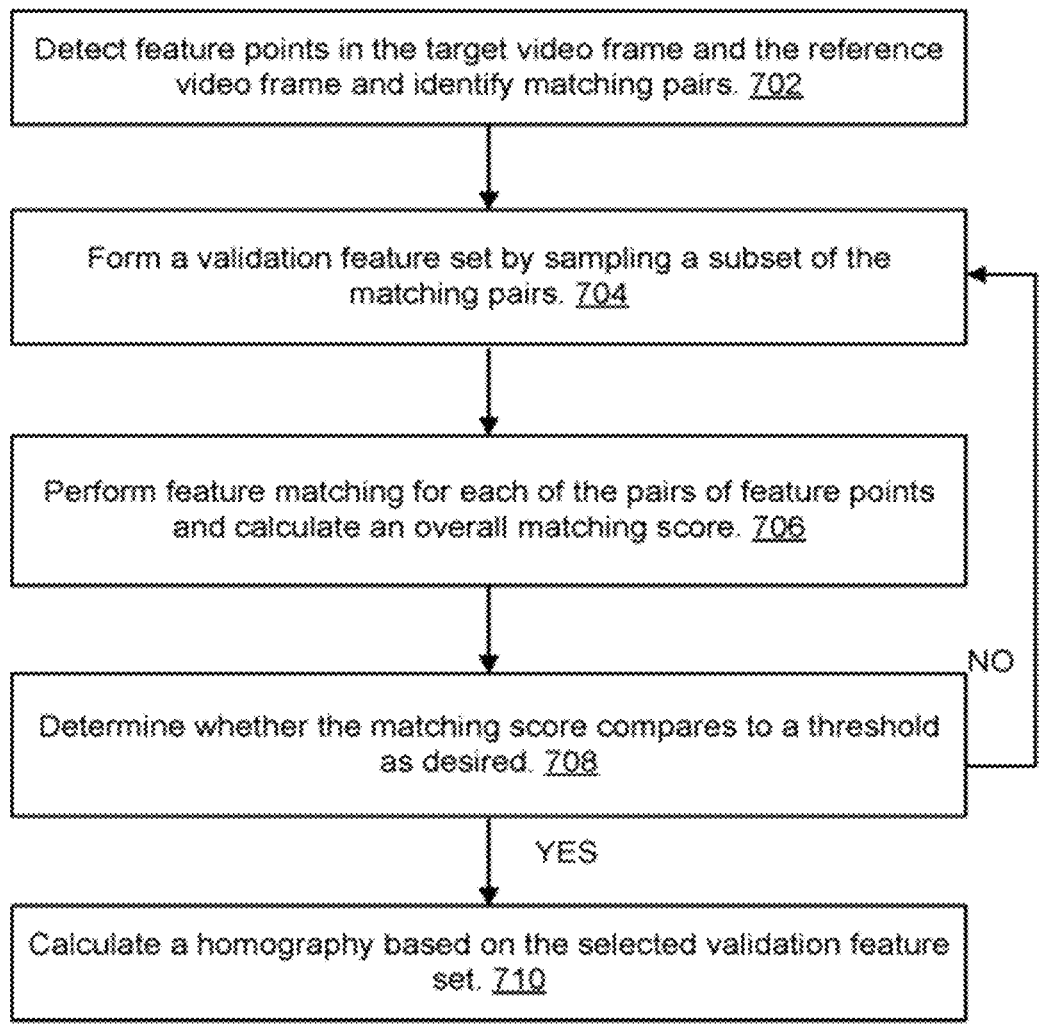
FIG. 7 is a flowchart illustrating a method of performing video frame alignment, according to an embodiment of the present invention.

FIG. 7 is a flowchart illustrating a method of performing video frame alignment according to an embodiment of the present invention. In an example, the flow 700 includes operation 702, in which the computer system (e.g., computer system 102) detects feature points in the target video frame and the reference video frame and identifying matching pairs. The feature points can be detected using video processing application 104. Feature points can be detected or identified in the target video frame and the reference video frame based on ORB feature points. Outlier feature points can be discarded by estimating fundamental matrices using RAN SAC.

In an example, the flow 700 includes operation 704, in which the computer system (e.g., computer system 102) forms a validation feature set by sampling a subset of the matching pairs. Sampling a subset can improve performance. In an example, video processing application 104 identifies 1000 matching pairs of feature points in the target video frame the reference video frame and randomly selects 30% of the matching pairs to provide 300 matching pairs of feature points.

In an example, the flow 700 includes operation 706, in which the computer system (e.g., computer system 102) performs feature matching for each of the pairs of feature points and calculates an overall matching score. Continuing the example, video processing application 104 identifies feature point 612, which is matched to feature point 622 and feature point 614, which is matched to feature point 624. A matching score is determined for each matching pair, which can be based on a correlation between pixels corresponding to the feature points, and an overall matching score is computed.

In an example, the flow 700 includes operation 708, in which the computer system (e.g., computer system 102) determines whether the matching score exceeds a threshold for high matching scores or is less than a threshold for low matching scores, for example, a matching score corresponding to a minimum average matching distance between the subset of feature points. In some cases, the minimum average matching distance is a minimum total loss between all matching pairs. In some embodiments, operation 708 compares the overall matching score to a threshold and a desired matching score is characterized by a value greater than a threshold, whereas in other embodiments, a desired matching score is characterized by a value less than a threshold. If the overall matching score is not high enough or low enough, operations 704, 706, and 708 are repeated until a desired overall matching score is achieved. In other embodiments, operations 704, 706, and 708 are repeated a predetermined number of times (e.g., K times) to provide K sets of validation feature sets and K overall matching scores. In this case, the validation feature set with the highest/lowest overall matching score can be selected as the validation feature set that is used to generate the homography.

In an example, the flow 700 includes operation 710, in which the computer system (e.g., computer system 102) calculates a homography based on the validation set with the highest/lowest matching score, for example, a matching score associated with a lowest error between matching pairs of feature points. Thus, a homography between the reference video frame and the target video frame is calculated based on the selected validation feature set. Using this ensemble method, more accurate homographies are achieved. The homography can then be used to recover the missing region in the target frame.

The flow 700 is described in connection with a computer system that is an example of the computer systems described herein. Some or all of the operations of the flows can be implemented via specific hardware on the computer system and/or can be implemented as computer-readable instructions stored on a non-transitory computer-readable medium of the computer system. As stored, the computer-readable instructions represent programmable modules that include code executable by a processor of the computer system. The execution of such instructions configures the computer system to perform the respective operations. Each programmable module in combination with the processor represents a means for performing a respective operation(s). While the operations are illustrated in a particular order, it should be understood that no particular order is necessary and that one or more operations may be omitted, skipped, and/or reordered.

Returning to FIG. 3, in an example, the flow 300 includes operation 312, in which the computer system (e.g., computer system 102) replaces, in the target video frame, pixels corresponding to the mask. Continuing the example, video processing application 104 uses the homography generated at operation 310 to obtain the replacement pixels from the reference video frame, which are then used to inpaint the mask area in the target video frame accordingly.

It should be appreciated that the specific steps illustrated in FIG. 3 provide a particular method of performing pixel propagation and video inpainting, according to an embodiment of the present invention. As noted above, other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

The flow 300 is described in connection with a computer system that is an example of the computer systems described herein. Some or all of the operations of the flows can be implemented via specific hardware on the computer system and/or can be implemented as computer-readable instructions stored on a non-transitory computer-readable medium of the computer system. As stored, the computer-readable instructions represent programmable modules that include code executable by a processor of the computer system. The execution of such instructions configures the computer system to perform the respective operations. Each programmable module in combination with the processor represents a means for performing a respective operation(s). While the operations are illustrated in a particular order, it should be understood that no particular order is necessary and that one or more operations may be omitted, skipped, and/or reordered.

Figure 8:
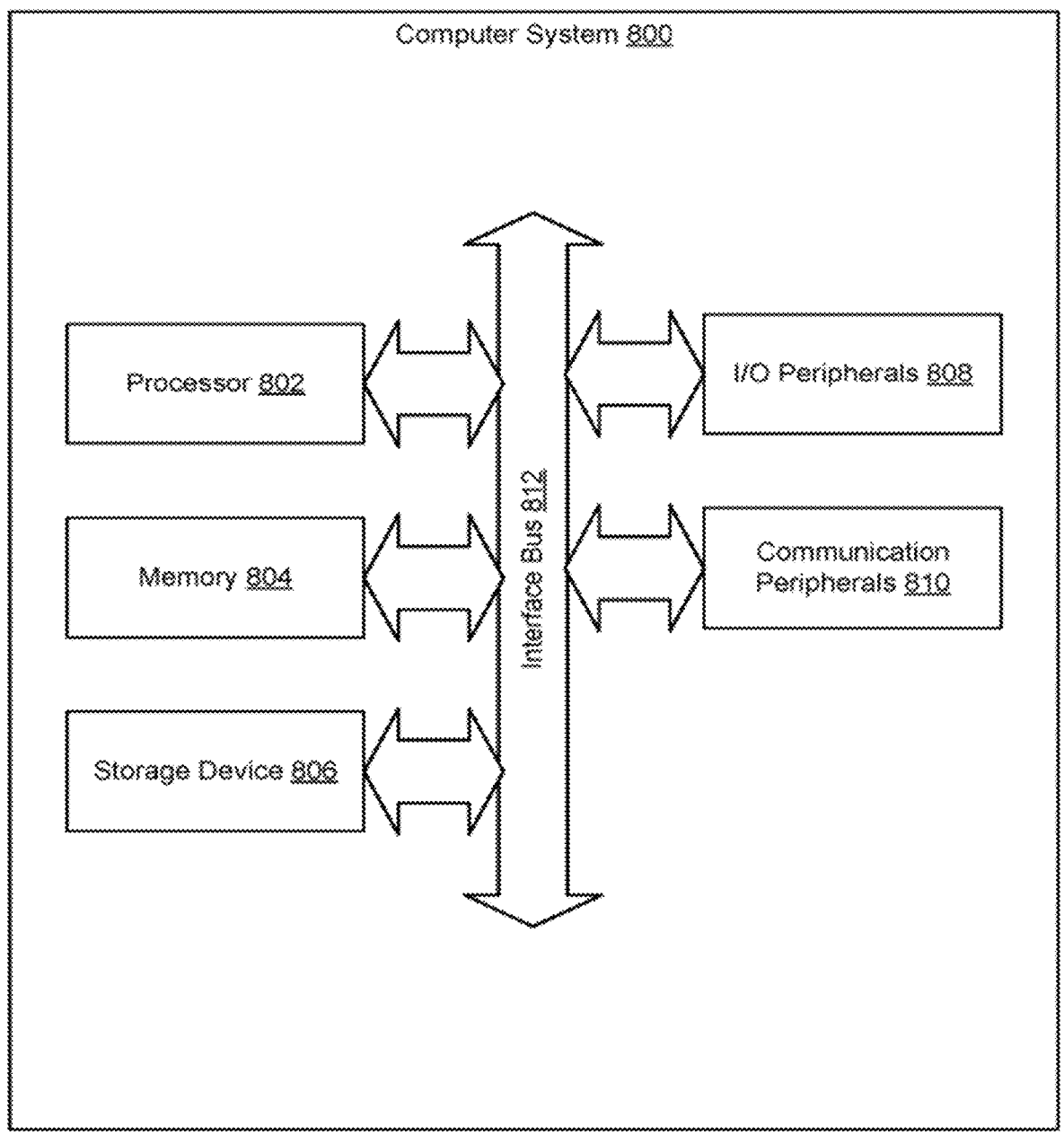
FIG. 8 illustrates an example of a computer system, according to an embodiment of the present invention.

FIG. 8 illustrates an example of a computer system 800 according to certain embodiments. The computer system 800 is an example of the computer system described herein above. Although these components are illustrated as belonging to a same computer system 800, the computer system 800 can also be distributed.

The computer system 800 includes at least a processor 802, a memory 804, a storage device 806, input/output peripherals (I/O) 808, communication peripherals 810, and an interface bus 812. The interface bus 812 is configured to communicate, transmit, and transfer data, controls, and commands among the various components of the computer system 800. The memory 804 and the storage device 806 include computer-readable storage media, such as RAM, ROM, electrically erasable programmable read-only memory (EEPROM), hard drives, CD-ROMs, optical storage devices, magnetic storage devices, electronic nonvolatile computer storage, for example Flash® memory, and other tangible storage media. Any of such computer readable storage media can be configured to store instructions or program codes embodying embodiments of the disclosure. The memory 804 and the storage device 806 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computer system 800.

Further, the memory 804 includes an operating system, programs, and applications. The processor 802 is configured to execute the stored instructions and includes, for example, a logical processing unit, a microprocessor, a digital signal processor, and other processors. The memory 804 and/or the processor 802 can be virtualized and can be hosted within another computer system of, for example, a cloud network or a data center. The I/O peripherals 808 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 808 are connected to the processor 802 through any of the ports coupled to the interface bus 812. The communication peripherals 810 are configured to facilitate communication between the computer system 800 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computer system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "including," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

In this description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The various features and processes described above may be used independently of one another, or may be combined in various ways. All possible combinations and subcombinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A method implemented by a computer system, the method comprising: receiving a sequence of video frames and a set of masks, wherein the sequence of video frames comprises an initial video frame including an undesired object and the set of masks comprises an initial mask corresponding to the undesired object; identifying from the sequence of video frames, a subset of video frames; creating, using the set of masks, a combined mask corresponding to the undesired object;
  selecting, from the sequence of video frames, a reference video frame that comprises replacement pixels corresponding to pixels in a target video frame that are associated with the combined mask when:
  an overlap between the combined mask in the reference video frame and the combined mask in the target video frame is less than a first threshold; and
  an optical flow metric of the combined mask in the reference video frame compared to the combined mask in the target video frame is less than a second threshold;
  aligning the reference video frame with the target video frame; and replacing, in the target video frame, pixels corresponding to the combined mask with pixels corresponding to the combined mask in the reference video frame and removing the undesired object from the target video frame.

2. The method of claim 1, wherein receiving the set of masks comprises generating the set of masks by identifying, in each video frame of the sequence of video frames, a set of pixels that correlates with a set of pixels of the initial mask.

3. The method of claim 1, wherein creating the combined mask comprises:
  determining a subset of the set of masks for which a stability score is greater than a third threshold; and
  forming, from the subset of the set of masks, the combined mask as a union of pixels corresponding to the undesired object in the subset of the set of masks.

4. The method of claim 1, wherein determining the overlap comprises:
  identifying, in the reference video frame, a first set of pixels that correspond to pixels in the combined mask;
  locating, in the target video frame, a second set of pixels that corresponds to the first set of pixels; and
  computing a stability score using the first set of pixels and the second set of pixels.

5. The method of claim 1, further comprising outputting the target video frame to a display device.

6. The method of claim 1, further comprising determining the optical flow metric by:
  determining a difference between pixels that correspond to the combined mask in the reference video frame and pixels that correspond to the combined mask in the target video frame; and
  computing the optical flow metric based on the difference.

7. The method of claim 1, wherein aligning the reference video frame with the target video frame comprises:
  a) determining a plurality of feature points in the target video frame and the reference video frame;
  b) sampling a subset of the plurality of feature points to provide a validation feature set;
  c) performing feature matching for the validation feature set;
  d) calculating an overall matching score for the validation feature set;
  iteratively performing b) through d) a predetermined number of times;
  selecting the validation feature set having a highest overall matching score; and
  computing a homography for the selected validation feature set.

8. The method of claim 7, wherein sampling the subset of the plurality of feature points comprises performing a random sampling.

9. A computer system, including: one or more processors; and
one or more non-transitory computer-storage media storing instructions that, upon execution on by the one or more processors, cause the computer system to perform operations including:
receiving a sequence of video frames and a set of masks, wherein the sequence of video frames comprises an initial video frame including an undesired object and the set of masks comprises an initial mask corresponding to the undesired object;
identifying from the sequence of video frames, a subset of video frames;
creating, using the set of masks, a combined mask corresponding to the undesired object;
selecting, from the sequence of video frames, a reference video frame that comprises replacement pixels corresponding to pixels in a target video frame that are associated with the combined mask when:
an overlap between the combined mask in the reference video frame and the combined mask in the target video frame is less than a first threshold; and
an optical flow metric of the combined mask in the reference video frame compared to the combined mask in the target video frame is less than a second threshold;
aligning the reference video frame with the target video frame; and
replacing, in the target video frame, pixels corresponding to the combined mask with pixels corresponding to the combined mask in the reference video frame and removing the undesired object from the target video frame.

10. The computer system of claim 9, wherein receiving the set of masks comprises generating the set of masks by identifying, in each video frame of the sequence of video frames, a set of pixels that correlates with a set of pixels of the initial mask.

11. The computer system of claim 9, wherein creating the combined mask comprises:
determining a subset of the set of masks for which a stability score is greater than a third threshold; and
forming, from the subset of the set of masks, the combined mask as a union of pixels corresponding to the undesired object in the subset of the set of masks.

12. The computer system of claim 9, wherein the operations further comprise determining an optical flow metric by:
determining a difference between pixels that correspond to the combined mask in the reference video frame and pixels that correspond to the combined mask in the target video frame; and
computing the optical flow metric based on the difference.

13. The computer system of claim 9, wherein aligning the reference video frame with the target video frame comprises:
a) determining a plurality of feature points in the target video frame and the reference video frame;
b) sampling a subset of the plurality of feature points to provide a validation feature set;
c) performing feature matching for the validation feature set; d) calculating an overall matching score for the validation feature set;
iteratively performing b) through d) a predetermined number of times;
selecting the validation feature set having a highest overall matching score; and
computing a homography for the selected validation feature set.

14. The computer system of claim 9, wherein sampling the subset of the plurality of feature points comprises performing a random sampling.

15. One or more non-transitory computer-storage media storing instructions that, upon execution on a computer system, cause the computer system to perform operations including:
receiving a sequence of video frames and a set of masks, wherein the sequence of video frames comprises an initial video frame including an undesired object and the set of masks comprises an initial mask corresponding to the undesired object;
identifying from the sequence of video frames, a subset of video frames; creating, using the set of masks, a combined mask corresponding to the undesired object;
selecting, from the sequence of video frames, a reference video frame that comprises replacement pixels corresponding to pixels in a target video frame that are associated with the combined mask when:
an overlap between the combined mask in the reference video frame and the combined mask in the target video frame is less than a first threshold; and
an optical flow metric of the combined mask in the reference video frame compared to the combined mask in the target video frame is less than a second threshold;
aligning the reference video frame with the target video frame; and
replacing, in the target video frame, pixels corresponding to the combined mask with pixels corresponding to the combined mask in the reference video frame and removing the undesired object from the target video frame.

16. The non-transitory computer-storage media of claim 15, wherein receiving the set of masks comprises generating the set of masks by identifying, in each video frame of the sequence of video frames, a set of pixels that correlates with a set of pixels of the initial mask.

17. The non-transitory computer-storage media of claim 15, wherein creating the combined mask comprises:
determining a subset of the set of masks for which a stability score is greater than a third threshold; and
forming, from the subset of the set of masks, the combined mask as a union of pixels corresponding to the undesired object in the subset of the set of masks.

18. The non-transitory computer-storage media of claim 15, wherein the operations further comprise determining the optical flow metric by:
determining a difference between pixels that correspond to the combined mask in the reference video frame and pixels that correspond to the combined mask in the target video frame; and
computing the optical flow metric based on the difference.

19. The non-transitory computer-storage media of claim 15, wherein aligning the reference video frame with the target video frame comprises:
a) determining a plurality of feature points in the target video frame and the reference video frame;
b) sampling a subset of the plurality of feature points to provide a validation feature set;
c) performing feature matching for the validation feature set;
d) calculating an overall matching score for the validation feature set;

iteratively performing b) through d) a predetermined number of times;
selecting the validation feature set having a highest overall matching score; and
computing a homography for the selected validation feature set.

20. The non-transitory computer-storage media of claim 19, wherein sampling the subset of the plurality of feature points comprises performing a random sampling.

* * * * *